(12) United States Patent
Francis

(10) Patent No.: US 9,580,129 B2
(45) Date of Patent: Feb. 28, 2017

(54) ASSEMBLY COMPRISING AN INTERNAL COMBUSTION ENGINE SELECTIVELY COUPLE TO GENERATOR AND TO ANOTHER MECHANICALLY DRIVEN DEVICE

(71) Applicant: Burromax LLC, Kirkwood, MO (US)

(72) Inventor: Kenneth Francis, Kirkwood, MO (US)

(73) Assignee: Burromax LLC, Kirkwood, MO (US)

( * ) Notice: Subject to any disclaimer, the term of this patent is extended or adjusted under 35 U.S.C. 154(b) by 0 days.

(21) Appl. No.: 14/711,431

(22) Filed: May 13, 2015

(65) Prior Publication Data
US 2016/0332688 A1 Nov. 17, 2016

(51) Int. Cl.
| | | |
|---|---|---|
| B62J 99/00 | (2009.01) | |
| B62K 11/00 | (2006.01) | |
| B62M 7/02 | (2006.01) | |
| B62M 25/00 | (2006.01) | |
| B62M 11/04 | (2006.01) | |
| F16H 1/22 | (2006.01) | |

(52) U.S. Cl.
CPC ............... *B62J 99/00* (2013.01); *B62K 11/00* (2013.01); *B62M 7/02* (2013.01); *B62M 11/04* (2013.01); *B62M 25/00* (2013.01); *F16H 1/22* (2013.01)

(58) Field of Classification Search
CPC . B62J 99/00; B62K 11/00; B62M 7/02; F16H 1/22
USPC ........................................................ 180/230
See application file for complete search history.

(56) References Cited

U.S. PATENT DOCUMENTS

| | | | |
|---|---|---|---|
| 5,606,244 A | 2/1997 | Migdal | |
| 6,170,597 B1* | 1/2001 | Fukuda | B60K 17/08 180/292 |
| 6,182,784 B1 | 2/2001 | Pestotnik | |
| 6,386,067 B1* | 5/2002 | Inoue | F16H 45/02 74/730.1 |
| 6,603,227 B2 | 8/2003 | Rose, Sr. | |
| 6,617,725 B2 | 9/2003 | Rose, Sr. | |
| 6,672,414 B2 | 1/2004 | Laflamme | |
| 6,840,479 B1 | 1/2005 | Przygoda et al. | |
| 6,868,932 B1 | 3/2005 | Davis et al. | |
| 6,941,918 B2* | 9/2005 | Laimboeck | F02B 61/02 123/195 R |
| 7,284,625 B2 | 10/2007 | Jones | |
| 7,527,119 B2* | 5/2009 | Iizuka | B62K 25/20 180/227 |
| 7,530,420 B2* | 5/2009 | Davis | B60K 5/06 180/233 |
| 7,600,594 B2 | 10/2009 | Jones | |
| 7,833,126 B2 | 11/2010 | Venter | |
| 7,980,122 B2* | 7/2011 | Fujimoto | F02B 61/02 73/115.02 |
| 8,567,276 B2* | 10/2013 | Saitoh | B62K 11/04 74/340 |

(Continued)

*Primary Examiner* — Kevin Hurley
*Assistant Examiner* — Michael Stabley
(74) *Attorney, Agent, or Firm* — Thompson Coburn LLP

(57) ABSTRACT

A generator assembly comprises an internal combustion engine connected to a generator by a transmission. The transmission comprises multiple outputs such that another mechanically powered device can be driven by the engine. The transmission includes a shift mechanism for selecting which output receives power from the engine. The assembly may also be a vehicle and one of the devices can be a drivetrain for powering a drive wheel of the vehicle.

9 Claims, 4 Drawing Sheets

(56) References Cited

U.S. PATENT DOCUMENTS

| | | | |
|---|---|---|---|
| 8,662,233 B2* | 3/2014 | Saitoh | F16H 3/006 180/226 |
| 8,707,814 B2* | 4/2014 | Saitoh | F16H 63/18 180/230 |
| 8,763,486 B2* | 7/2014 | Oishi | F16H 3/093 180/230 |
| 8,826,762 B2* | 9/2014 | Matsuda | F16D 11/14 74/333 |
| 2006/0289214 A1* | 12/2006 | Katsuhiro | F01L 13/08 180/65.225 |
| 2010/0107792 A1* | 5/2010 | Saitoh | F16H 63/18 74/337.5 |
| 2010/0264759 A1 | 10/2010 | Shafer et al. | |
| 2011/0309055 A1 | 12/2011 | Rozmarynowski et al. | |
| 2012/0049638 A1 | 3/2012 | Dorn et al. | |
| 2013/0037372 A1* | 2/2013 | Fukaya | F16D 21/06 192/85.63 |
| 2013/0062135 A1* | 3/2013 | Saitoh | F16H 3/006 180/230 |
| 2013/0269456 A1 | 10/2013 | Jones | |
| 2014/0001905 A1 | 1/2014 | Schawitsch | |
| 2014/0297079 A1* | 10/2014 | Saitoh | B60W 20/15 701/22 |
| 2015/0094176 A1* | 4/2015 | Kakemizu | B62K 11/06 474/8 |

* cited by examiner

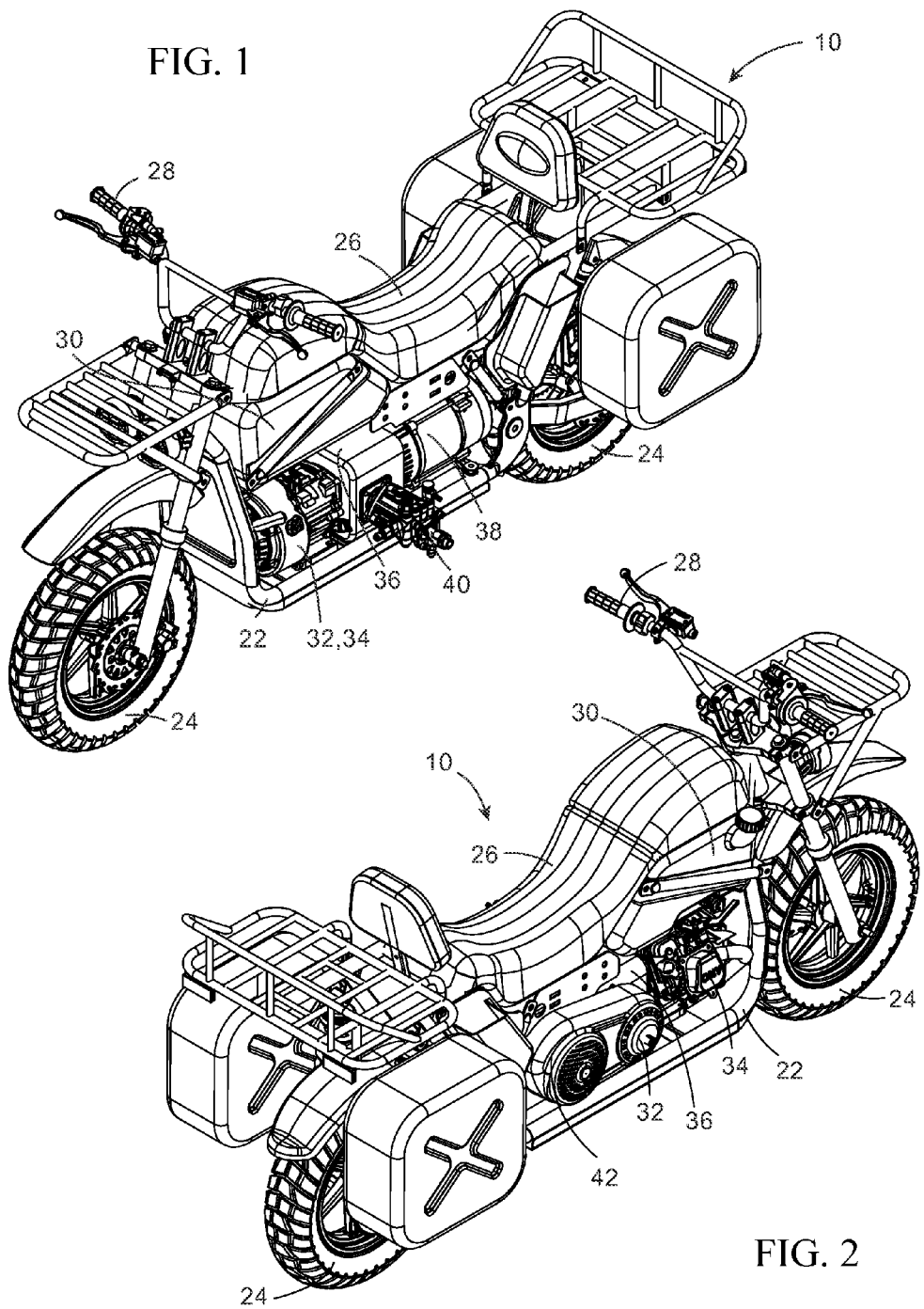

ASSEMBLY COMPRISING AN INTERNAL COMBUSTION ENGINE SELECTIVELY COUPLE TO GENERATOR AND TO ANOTHER MECHANICALLY DRIVEN DEVICE

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to generators powered by an internal combustion engine. More particularly, the present invention pertains to an assembly comprising an internal combustion assembly that is selectively connectable to a generator and to at least one other mechanically driven device via an adjustable transmission.

General Background

Various types and sizes of gas powered generators exist on the market today. Many homeowners purchase small gas powered generators for use to electrically power critical home appliances when normal electrical service is disrupted. Similarly, contractors and farmers may use such small gas powered generators to power hand tools and other devices in remote places where electricity would otherwise not be available. Such generators may be configured to output standard line alternating voltage. Such generators may also be configured to directly supply electricity for welding. Regardless of the type of output power provided by the unit, the generator is typically operatively connected to the driveshaft of a small spark-ignition engine in a manner such that it is not possible to operatively disengage the generator from the engine without disassembling the unit. Thus, the engine is essentially dedicated to powering only the one generator. Similarly, other devices that are powered by small combustion engines are typically connected to their own dedicated engines. For example, a homeowner may have a generator, a compressor, and a pressure sprayer, with each having its own dedicated combustion engine. Thus, such a homeowner must pay for and store three similar or identical engines.

Another issue involving devices such as gas powered generators, compressors, and pressure sprayers are that such devices can be somewhat bulky and heavy. This makes it difficult to transport such devices by hand over appreciable distances. Thus, when such a device is needed at a remote location, a person often uses a car, truck, or SUV to transport the device to the remote location. In some cases, that may not be efficient. In the case of generators, an all-terrain vehicle (ATV) has been made which is essentially a mobile generator and lawnmower. That ATV comprises a generator driven by an internal combustion engine and a four-wheel chassis having wheels and a mower deck driven by at least one electric motor. The generator is also capable of providing traditional electrical tools with electrical power. While practical in some regards, a disadvantage to such an ATV is that the converting mechanical power to electricity and then back into mechanical power (when riding/driving the vehicle) is inefficient since each power conversion causes an inherent reduction in usable power. Thus, the engine produces more power than can be provided to drive the wheels and mower deck. Likewise, similar power losses apply when the generator is used to power a device such as an electrically powered air compressor.

SUMMARY OF THE INVENTION

The present invention is directed to an assembly in which a combustion engine is operatively connected to two or more devices via a transmission such that the engine can mechanically power each of the devices. The transmission is also configured such that at least one of the devices can be selectively and operatively disconnected from the engine. One of the devices powered by the engine may be a straddle seat vehicle used to transport a generator that can also be powered by the engine.

In one aspect of the invention a motorcycle comprises a frame, handlebars, two wheels, a combustion engine, a mechanical transmission, an electrical generator, and a mechanical drivetrain. The wheels support the frame from the ground and one of the wheels is pivotable about a steering axis relative to the frame via the handlebars. The combustion engine is supported by the frame and has an output shaft configured and adapted to provide rotation mechanical power. The transmission is supported by the frame and has an input member, at least first and second output members, and a shifting mechanism. The input member is operatively coupled to the output shaft of the combustion engine. The transmission is configured such that the input member is capable of rotationally driving each of the first and second output members via mechanical power provided by the combustion engine. The shifting mechanism is configured to operatively connect the first output member to the input member while operatively disconnecting the second output member from the input member. The shifting mechanism is also configured to, selectively and alternatively, operatively connect the second output member to the input member while operatively disconnecting the first output member from the input member. The shift mechanism is operator controlled. The electrical generator is operatively coupled to the first output member of the transmission in a manner such that the generator can produce electrical power from mechanical power generated by the combustion engine when the input member is operatively connected to the first output member. The drivetrain is operatively coupled to the second output member of the transmission and to one of the wheels in a manner such that the drivetrain can rotationally drive the wheel via mechanical power generated by the combustion engine when the input member is operatively connected to the second output member.

In another aspect of the invention a wheeled vehicle comprises a frame, a straddle seat, handlebars, at least two wheels, a combustion engine, a mechanical transmission, an electrical generator, and a mechanical drivetrain. The straddle seat is supported by the frame. The wheels are configured to support the frame from the ground and at least one of the wheels is pivotable relative to the frame via the handlebars. Each wheel has a low-pressure tire. The combustion engine is supported by the frame and has an output shaft configured and adapted to provide rotational mechanical power of not more than 19.0 kW. The transmission is supported by the frame and has an input member, at least first and second output members, and a shifting mechanism.

The input member is operatively coupled to the output shaft of the combustion engine. The transmission is configured such that the input member is capable of rotationally driving each of the first and second output members via mechanical power provided by the combustion engine. The shifting mechanism is configured to operatively connect the first output member to the input member while operatively disconnecting the second output member from the input member. The shifting mechanism is also being configured to, selectively and alternatively, operatively connect the second output member to the input member while operatively disconnecting the first output member from the input member. The shift mechanism is operator controlled. The generator is operatively coupled to the first output member of the transmission in a manner such that the generator can produce electrical power from mechanical power generated by the combustion engine when the input member is operatively connected to the first output member. The drivetrain is operatively coupled to the second output member of the transmission and to at least one of the wheels in a manner such that the drivetrain can rotationally drive the at least one wheel via mechanical power generated by the combustion engine when the input member is operatively connected to the second output member.

In yet another aspect of the invention a gas powered device comprises a combustion engine, a mechanical transmission, an electrical generator, a rotationally driven fluid pump. The combustion engine has an output shaft configured and adapted to provide rotational mechanical power of not more than 19.0 kW. The transmission has an input member, at least first and second output members, and a shifting mechanism. The input member is operatively coupled to the output shaft of the combustion engine. The transmission is configured such that the input member is capable of rotationally driving each of the first and second output members via mechanical power provided by the combustion engine. The shifting mechanism is configured to operatively connect the first output member to the input member while operatively disconnecting the second output member from the input member. The shifting mechanism is also configured to, selectively and alternatively, operatively connect the second output member to the input member while operatively disconnecting the first output member from the input member. The generator is operatively coupled to the first output member of the transmission in a manner such that the generator can produce electrical power from mechanical power generated by the combustion engine when the input member is operatively connected to the first output member. The fluid pump is operatively coupled to the second output member of the transmission in a manner such that the fluid pump can pump fluid from mechanical power generated by the combustion engine when the input member is operatively connected to the second output member. The fluid pump is an air compressor pump, a water pump, or a hydraulic fluid pump.

Further features and advantages of the present invention, as well as the operation of various embodiments of the present invention, are described in detail below with reference to the accompanying drawings.

BRIEF DESCRIPTION OF THE DRAWINGS

FIG. 1 is a perspective view of a motorcycle in accordance with the invention and shows the front, top, and right sides thereof.

FIG. 2 is a perspective view of the motorcycle showing in FIG. 1 and shows the rear, top, and left sides thereof.

Figure 3:
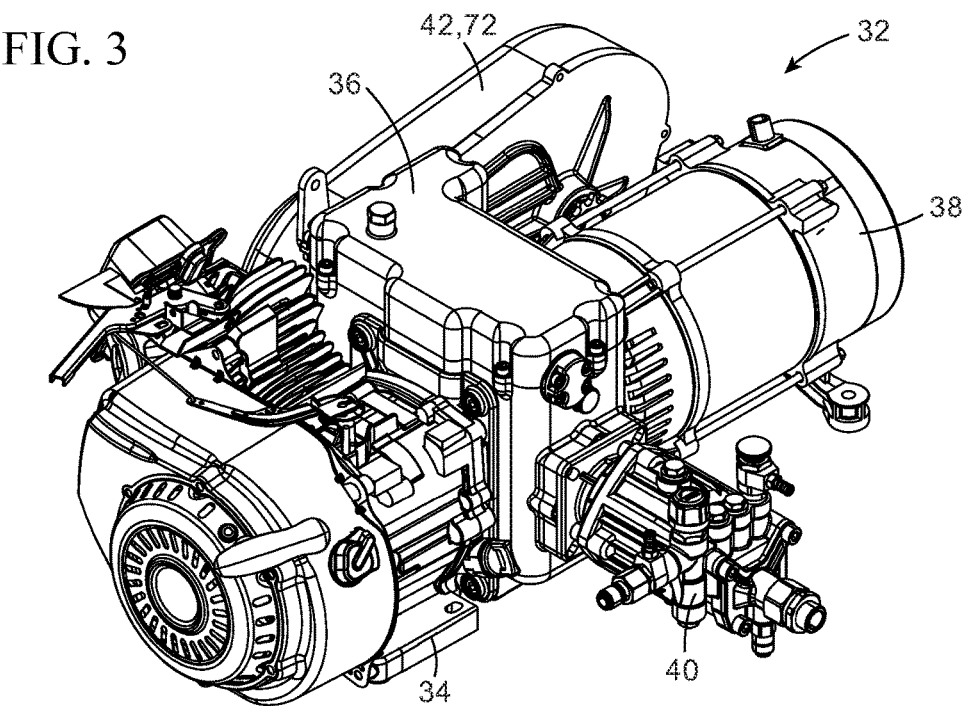
FIG. 3 is a perspective view of the power unit of the motorcycle shown in FIGS. 1 and 2 and shows the front, top, and right sides thereof.
Figure 4:
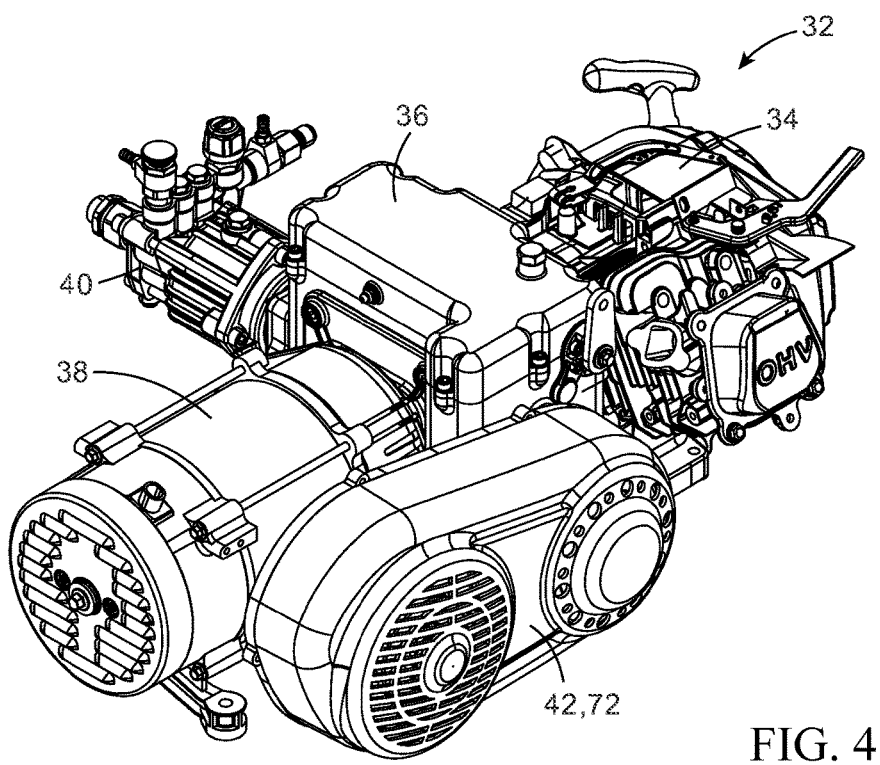
FIG. 4 is a perspective view of the power unit shown in FIG. 3 and shows the rear, top, and left sides thereof.
Figure 5:
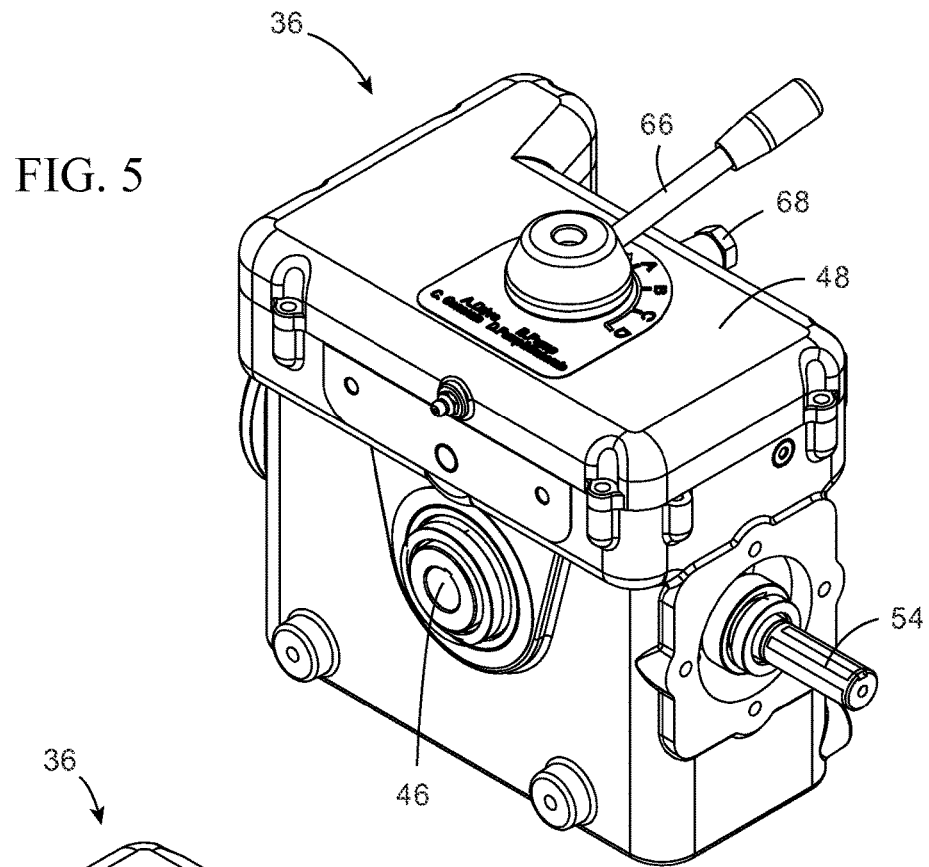
FIG. 5 is a perspective view of an alternative and preferred transmission in accordance with the invention and shows the front, top, and right sides thereof.
Figure 6:
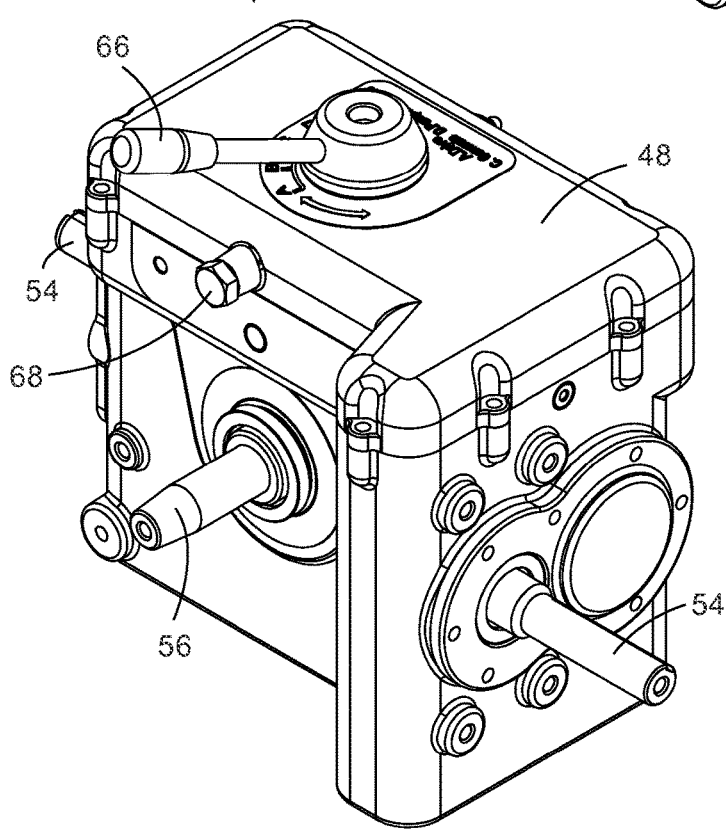
FIG. 6 is a perspective view of the transmission shown in FIG. 5 and shows the rear, top, and left sides thereof.
Figure 7:
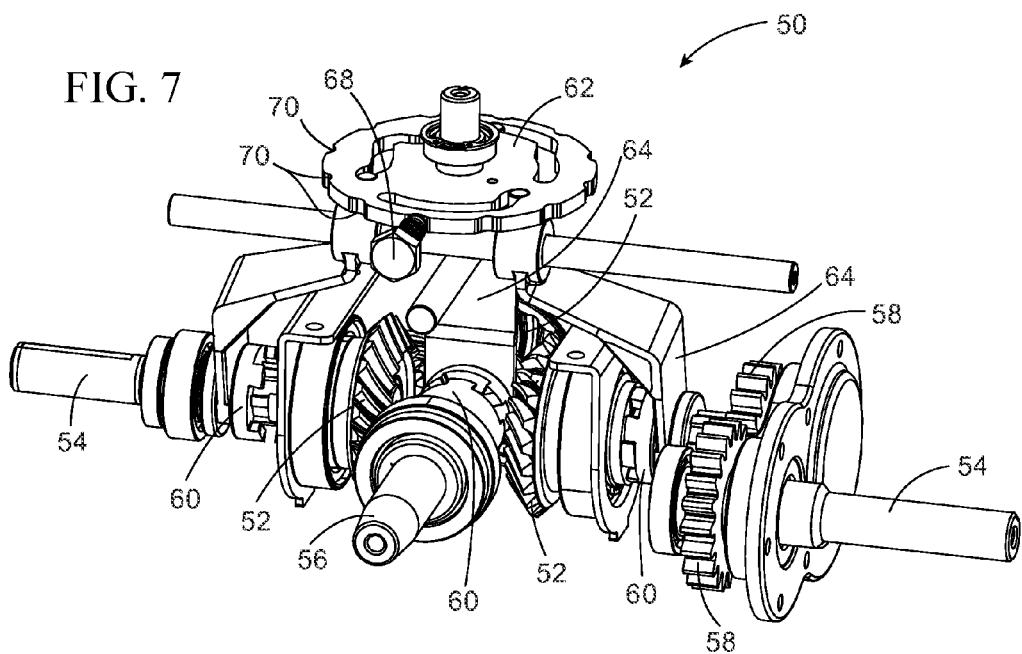
FIG. 7 is perspective view of the internal gearing and shift mechanism of the transmission shown in FIGS. 5 and 6.

Reference numerals in the written specification and in the drawing figures indicate corresponding items.

DETAILED DESCRIPTION OF THE PREFERRED EMBODIMENTS

A motorcycle (20) in accordance with the invention is shown in FIGS. 1 and 2. The motorcycle comprises a frame (22), two wheels (24), a straddle seat (26), handlebars (28), a gas tank (30) and a power unit (32). With the exception of the power unit (32) those items of the motorcycle (20) are connected and operate like they would if they were part of a traditional motorcycle. Thus, a detailed description of such items is not warranted and is not provided herein.

The power unit (32) is unique and comprises a combustion engine (34), a transmission (36), a generator (38), a fluid pump (40), and a drivetrain (42). The engine (34) is preferably a small spark-ignition engine as defined by the federal government of the United States and is preferably governed to run 3,500 RPM with a maximum output of no more than 19.0 kw. Preferably the driveshaft of the engine (34) faces and extends into a keyed female input member (46) of the transmission (36) in a manner such that the engine can rotationally drive the input member. The transmission comprises a housing (48) that houses internal gearing (50). The internal gearing (50) comprises three bevel gears (52) that allow the input member (46) to rotational drive two output members (54) oriented horizontally and at ninety degrees to the input member. A third output member (56) is axially aligned with the input member (46) and can also be rotational driven by the input member. A pair of normal gears (58) inverts the direction of rotation of the output member (54) that extends from the left side of the transmission (36). Three disengageable dog clutches (60) allow the each of the output members (54, 56) to be individually operatively disconnected from the input member (46). A slotted disk (62) and brackets (64) that operatively attach the dog clutches (60) to the slotted disk (62) allow all of the clutches to be controlled merely by rotating the slotted disk. A control lever (66) exterior to the housing (48) is connected to and controls the rotation of the slotted disk (62). A screw (68) with a spring loaded detent and recesses (70) on the edges of the slotted disk (62) releasably secures the slotted disk in distinct rotational orientations. Preferably there are four settable orientations. In one, only the output member (54) that extends out the right of the transmission (36) is driven by the input member (46). In another, only the output member (56) that extends out the rear of the transmission (36) is driven by the input member (46). In yet another, only the output member (54) that extends out the left of the transmission (36) is driven by the input member (46). And in the fourth orientation, the output member (56) that extends out the rear of the transmission (36) and the output member (54) that extends out of the left of the transmission are both driven by the input member (46).

The generator (38) is attached to the rear of transmission (36) and is driven by the output member (56) that extends out the rear of the transmission. The generator (38) is otherwise a standard generator and may be of the type having outlets for powering saws, drills, and other power tools or items. The generator (38) may also be the type that generates electricity used to weld.

The fluid pump (40) is attached to the left side of the transmission (36) and is driven by the output member (54) that extends out the left of the transmission. The fluid pump (40) is otherwise a standard pump of any particular type. For example, the pump (40) may be a water pump for use in pressure washing. The pump (40) could also be a pump for hydraulic fluid for use with such things as a log splitter. Still further, the pump (40) could be an air pump for compressing air.

The drivetrain (42) preferably includes a standard belt-type constant velocity transmission (72) with its own clutch. The drivetrain (42) is connected to the left side of the transmission (36) and operatively connects the left-side output member (54) to rear wheel (24) of the motorcycle (10) in a manner such that, when left-side output member (54) of the transmission (36) is operatively coupled to the input member (46) of the transmission, the engine (34) can rotationally drive the rear wheel of the motorcycle and thereby propel the motorcycle. The constant velocity transmission (72) of the drivetrain (42) allows the motorcycle (10) to accelerate while the engine (34) operates at a fairly constant speed that is close to its rated RPM.

In view of the foregoing, it should be appreciated that motorcycle (10) of the present invention can serves as a self-propelled mobile generator/pump. It should also be appreciated the propulsion power is delivered from the engine to the driving wheel mechanically, and therefore without converting mechanical power to electrical power and then back to mechanical power. Still further, it should be appreciated that the power unit described above be used to propel a vehicle, such as a four-wheel ATV, which has more than just two wheels.

Figure 8:
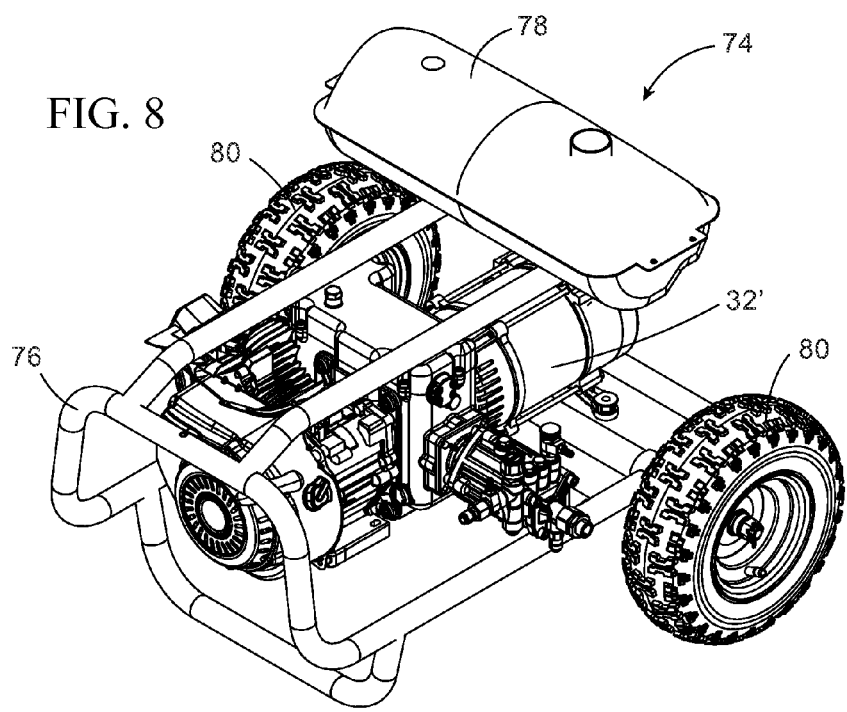
FIG. 8 is a perspective of a non-self-propelled assembly comprising a generator and a fluid pump that are both attached to the same engine.

FIG. 8 depicts an alternative embodiment of the invention that is not self-propelled. The generator assembly (74) shown in FIG. 8 comprises a frame/housing (76), a gas tank (78), two wheels (80) and the power unit (32') described above, but lacking the drivetrain (42). Thus, the generator assembly (74) can serve as a generator, a pump, or both, any of which can be driven by the same engine. As such, the generator assembly (74) is cheaper than the cost of a normal stand-alone gas powered generator and a stand-alone gas powered fluid pump, and takes less room to store. Still further, the generator assembly (74) could optionally have a second fluid pump or other mechanically driven device on its other side and thereby be three-tools-in-one.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A motorcycle comprising:
a frame;
handlebars;
two wheels configured to support the frame from the ground, one of the wheels being pivotable about a steering axis relative to the frame via the handlebars;
a combustion engine, the combustion engine being supported by the frame and having an output shaft configured and adapted to provide rotation mechanical power;
a mechanical transmission, the transmission being supported by the frame and having an input member, at least first and second output members, and a shifting mechanism, the input member being operatively coupled to the output shaft of the combustion engine, the transmission being configured such that the input member is capable of rotationally driving each of the first and second output members via mechanical power provided by the combustion engine, the shifting mechanism being configured to operatively connect the first output member to the input member while operatively disconnecting the second output member from the input member, the shifting mechanism also being configured to, selectively and alternatively, operatively connect the second output member to the input member while operatively disconnecting the first output member from the input member, the shift mechanism being operator controlled, the transmission comprising a third output member, the transmission being configured such that the input member is capable of rotationally driving the third output member via mechanical power provided by the combustion engine, the shifting mechanism being configured to operatively connect the third output member to the input member while operatively disconnecting the first and second output members from the input member, the shifting mechanism also being configured to, selectively and alternatively, disconnect the third output member from the input member;
an electrical generator, the generator being operatively coupled to the first output member of the transmission in a manner such that the generator can produce electrical power from mechanical power generated by the combustion engine when the input member is operatively connected to the first output member; and
a mechanical drivetrain, the drivetrain being operatively coupled to the second output member of the transmission and to one of the wheels in a manner such that the drivetrain can rotationally drive the one wheel via mechanical power generated by the combustion engine when the input member is operatively connected to the second output member.

2. The motorcycle of claim 1 wherein the combustion engine is configured to produce a maximum amount of power of not more than 19.0 kW.

3. The motorcycle of claim 2 wherein the engine is a general purpose, small spark-ignition, governed RPM engine.

4. The motorcycle of claim 1 wherein the shift mechanism cannot, selectively and alternatively, operatively connect both the first and second output members of the transmission to the input member of the transmission simultaneously.

5. The motorcycle of claim 1 wherein the shift mechanism comprises solely one control member that controls the operation of both the first and second output members of the transmission.

6. The motorcycle of claim 1 wherein the motorcycle comprises a rotationally driven fluid pump, the fluid pump is operatively coupled to the third output member of the transmission in a manner such that the fluid pump can pump fluid from mechanical power generated by the combustion engine when the input member is operatively connected to the third output member, and the fluid pump is one of an air compressor pump, a water pump, and a hydraulic fluid pump.

7. A wheeled vehicle comprising:
a frame;
a straddle seat supported by the frame;
handlebars;
at least two wheels configured to support the frame from the ground, at least one of the wheels being pivotable relative to the frame via the handlebars, each of the wheels having a low-pressure tire;
a combustion engine, the combustion engine being supported by the frame and having an output shaft configured and adapted to provide rotational mechanical power of not more than 19.0 kW;
a mechanical transmission, the transmission being supported by the frame and having an input member, at least first and second output members, and a shifting mechanism, the input member being operatively coupled to the output shaft of the combustion engine, the transmission being configured such that the input member is capable of rotationally driving each of the first and second output members via mechanical power provided by the combustion engine, the shifting mechanism being configured to operatively connect the first output member to the input member while operatively disconnecting the second output member from the input member, the shifting mechanism also being configured to, selectively and alternatively, operatively connect the second output member to the input member while operatively disconnecting the first output member from the input member, the shift mechanism being operator controlled, the shift mechanism being unable to, selectively and alternatively, operatively connect both the first and second output members of the transmission to the input member of the transmission simultaneously, the transmission comprising a third output member, the transmission being configured such that the input member is capable of rotationally driving the third output member via mechanical power provided by the combustion engine, the shifting mechanism being configured to operatively connect the third output member to the input member while operatively disconnecting the first and second output members from the input member, the shifting mechanism also being configured to, selectively and alternatively, disconnect the third output member from the input member;
an electrical generator, the generator being operatively coupled to the first output member of the transmission in a manner such that the generator can produce electrical power from mechanical power generated by the combustion engine when the input member is operatively connected to the first output member; and
a mechanical drivetrain, the drivetrain being operatively coupled to the second output member of the transmission and to at least one of the wheels in a manner such that the drivetrain can rotationally drive the at least one wheel via mechanical power generated by the combustion engine when the input member is operatively connected to the second output member.

8. The wheeled vehicle of claim 7 wherein the engine is a general purpose, small spark-ignition, governed RPM engine.

9. The wheeled vehicle of claim 7 wherein the motorcycle comprises a rotationally driven fluid pump, the fluid pump is operatively coupled to the third output member of the transmission in a manner such that the fluid pump can pump fluid from mechanical power generated by the combustion engine when the input member is operatively connected to the third output member, and the fluid pump is one of an air compressor pump, a water pump, and a hydraulic fluid pump.

* * * * *